United States Patent
Kim et al.

(10) Patent No.: US 7,054,365 B2
(45) Date of Patent: May 30, 2006

(54) METHOD FOR PROVIDING VARIABLE BIT RATE IN STREAMING SERVICE

(75) Inventors: Hyung-Chul Kim, Taejon (KR); Sung-Ho Ahn, Taejon (KR); Min-Gyu Kang, Taejon (KR); Doo-Hyeon Kim, Taejon (KR); Seung-Ku Hwang, Taejon (KR)

(73) Assignee: Electronics and Telecommunications Research Institute (KR)

( * ) Notice: Subject to any disclaimer, the term of this patent is extended or adjusted under 35 U.S.C. 154(b) by 1052 days.

(21) Appl. No.: 09/752,667

(22) Filed: Dec. 28, 2000

(65) Prior Publication Data

US 2002/0036704 A1    Mar. 28, 2002

(30) Foreign Application Priority Data

Sep. 27, 2000   (KR) ............................... 2000-56827

(51) Int. Cl.
  *H04B 1/66*   (2006.01)
  *H04N 11/02*  (2006.01)
  *H04N 11/04*  (2006.01)
  *H04N 7/12*   (2006.01)

(52) U.S. Cl. .................................. 375/240.2

(58) Field of Classification Search ........... 375/240.03, 375/240.04, 240.13, 240.16, 240.2, 240.23, 375/240.24, 240.28; 348/390.1, 410.1, 419.1; 382/232, 248, 250; H04N 7/12
See application file for complete search history.

(56) References Cited

U.S. PATENT DOCUMENTS

| | | | |
|---|---|---|---|
| 5,959,674 A * | 9/1999 | Jang et al. ................ | 375/240.2 |
| 6,339,619 B1 * | 1/2002 | Sugiyama .............. | 375/240.26 |
| 6,393,060 B1 * | 5/2002 | Jeong ..................... | 375/240.19 |
| 6,490,627 B1 * | 12/2002 | Kalra et al. .................. | 709/231 |
| 6,535,556 B1 * | 3/2003 | Kato et al. ............. | 375/240.05 |
| 6,771,703 B1 * | 8/2004 | Oguz et al. ............ | 375/240.03 |

* cited by examiner

*Primary Examiner*—Nhon Diep
(74) *Attorney, Agent, or Firm*—Blakely Sokoloff Taylor & Zafman

(57) ABSTRACT

In the method for managing a variable bit rate so as to provide a streaming service and in the record medium capable of being read through a computer having a record of a program to realize the inventive method, a frame rate controlling system through a removal of a frame and a fidelity controlling system are used to change a bit rate of multimedia video data and thereby provide a multimedia streaming service based on the various bit rates according to a bandwidth change of a communication network, the fidelity controlling system being gotten by differently providing selection ranges for discrete cosine transform (DCT) coefficients in a unit of a block within a frame. This inventive method comprises a first step of decomposing an original video bit stream stored already, into a file type capable of supporting the variable bit rate, and then storing it; a second step of merging data based on the decomposed type by considering a traffic state of a communication network; and a third step of providing the streaming service by using the video bit stream merged, whereby effectuating in a use of an information communication system etc.

7 Claims, 7 Drawing Sheets

FIG. 3
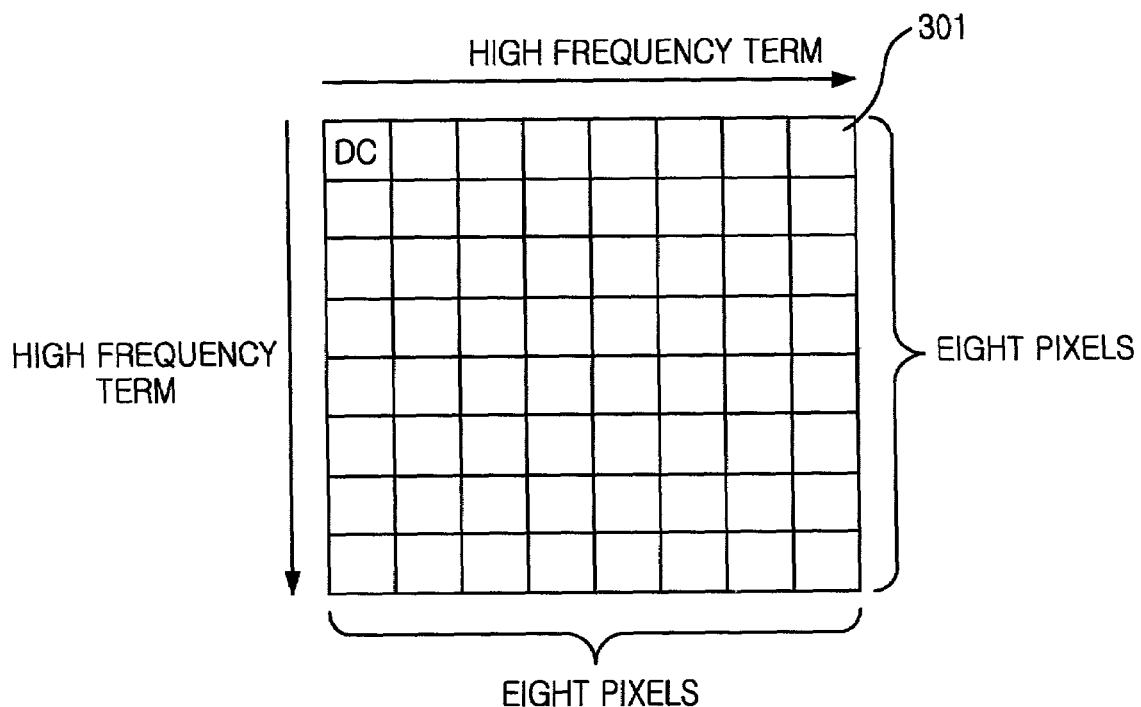
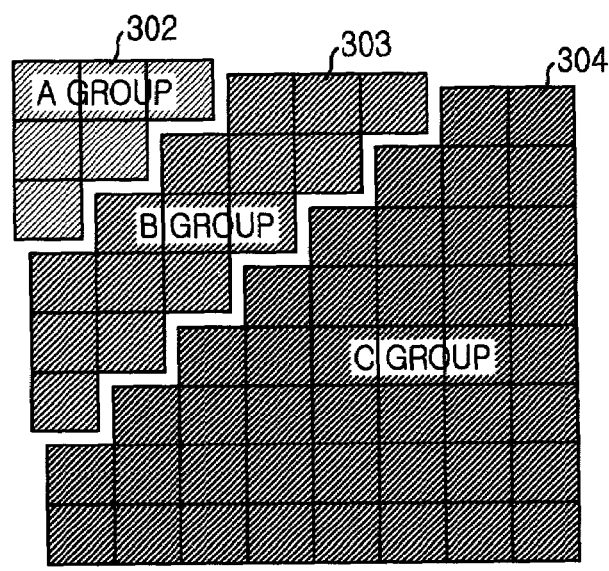

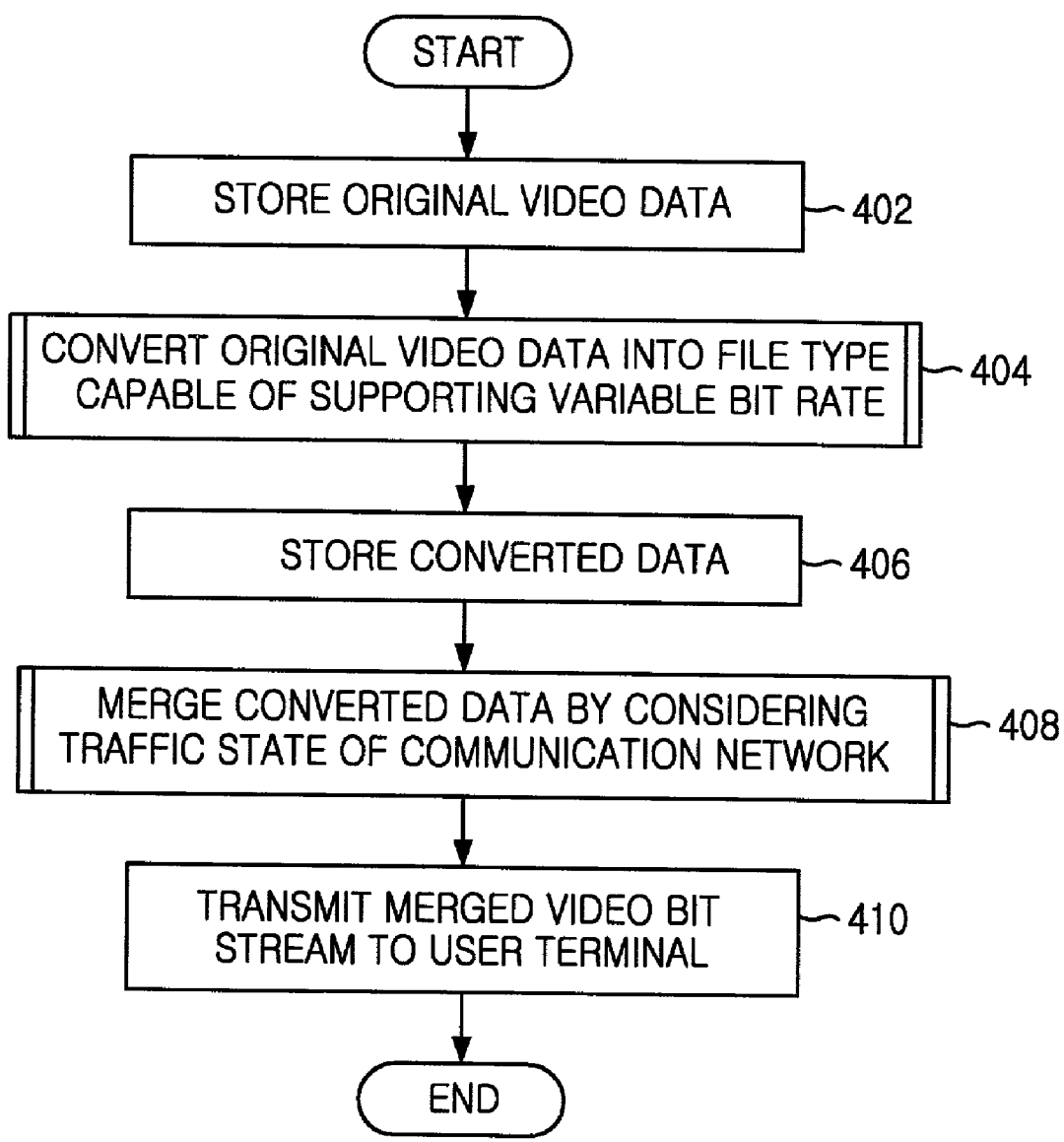

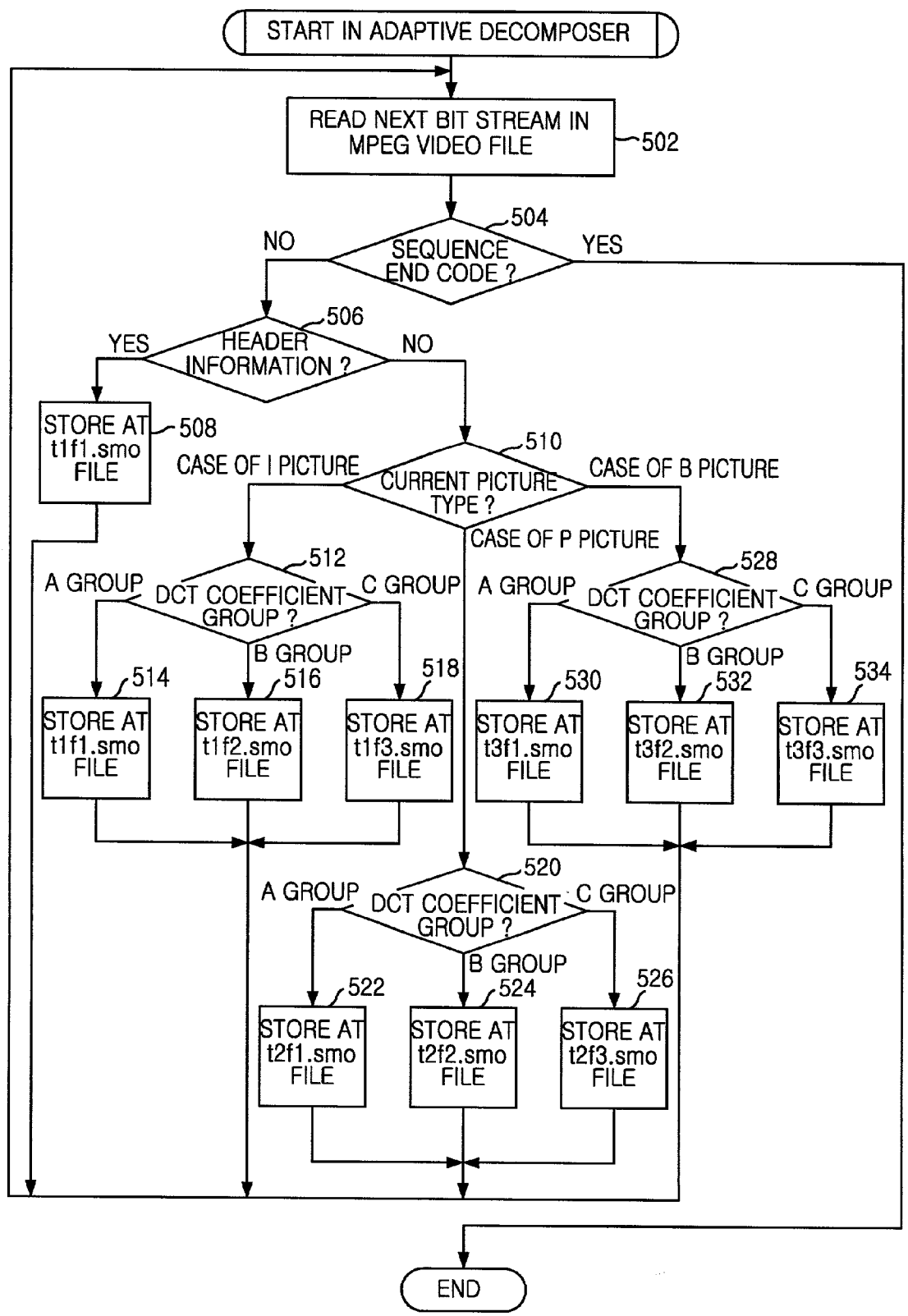

METHOD FOR PROVIDING VARIABLE BIT RATE IN STREAMING SERVICE

FIELD OF THE INVENTION

The present invention relates to a method for providing a variable bit rate in a multimedia streaming service and a record medium capable of being read through a computer having a record of a program to realize the inventive method, in a media scaling technique field of a transducing technique for varying a bit rate of original data so as to control a quantity of transmission data by adapting to a change of a communication network bandwidth in the multimedia streaming service.

DESCRIPTION OF THE PRIOR ART

Conventional techniques in this field are almost based on a transcoding system to control a bit rate of multimedia data.

That is, it is selected a method for simply controlling only a frame rate of a method for re-controlling a quantization parameter Q used in a video compression in order to gain a desired bit rate through a control of a fidelity.

In the simple frame rate controlling method, there is a considerable effect of reducing a bit rate of a bit stream transmitted by reducing the number of firstly reproduced frames under a state that an original fidelity is maintained, but a limitation in providing a bit rate of various bandwidth.

In the method for controlling the fidelity by re-controlling the quantization parameter Q, there is an effect of reducing the bit rate of the bit stream transmitted by a degradation of a fidelity, but the quantization parameter Q re-controlled after restoring already compressed video data to the original state should be applied, to again perform the quantization, therefore, a process based on a real time is difficult and this method is not suitable for the real time multimedia streaming service.

SUMMARY OF THE INVENTION

Therefore, it is an object of the present invention to provide a method for managing a variable bit rate so as to provide a ceaseless multimedia streaming service by adapting to a change of a communication network bandwidth, and a record medium capable of being read through a computer having a record of a program to realize the inventive method.

That it, there is the object of the invention to provide the method for providing a variable bit rate and a record medium capable of being read through a computer having a record of a program to realize the invention method, the method being for increasing/reducing and also transmitting according to a change of a increasing/reducing and also transmitting a bit rate of a video databit stream to be transmitted according to a change of a communication network bandwidth in performing a real time streaming service, after previously changing already compressed video data to variable bit rate data and then storing it.

In other words, in the inventive method for managing a variable bit rate and a record medium capable of being read through a computer having a record of a program to realize the inventive method, the frame rate controlling method through a removal of a frame and the fidelity controlling method are used to change the bit rate of the multimedia video data and to thereby provide the multimedia streaming service based on the various bit rates according to a bandwidth change of a communication network, the fidelity controlling method being gotten by differently providing selection ranges for discrete cosine transform (DCT) coefficients in a unit of a block within the frame.

In accordance with the present invention to achieve the above objects, the method for managing a variable bit rate for a streaming service in an information communication system, includes a first step of decomposing an original video bit stream stored already, into a file type capable of supporting the variable bit rate, then storing it; a second step of merging data based on the divided type by considering a traffic state of the communication network; and a third step of providing the streaming service by using the merged video bit stream.

In accordance with the present invention, further, in order to manage the variable bit rate for the streaming service, in a bit stream server having an equipment of a processor based on a large capacity, it is provided the record medium capable of being read through a computer having a record of a program to realize a first function of decomposing an original video bit stream stored already, into a file type capable of supporting the variable bit rate, then storing it in a stream server having a processor based on a large-capacity; a second function of merging data based on the decomposed type by considering a traffic state of the communication network; and a third function of providing the streaming service by using the merged video bit stream.

Namely, it is provided the inventive method of managing moving picture expert group (hereinafter, referred to as "MPEG") video data to actively change the transmission bit rate according to a change of the bandwidth in executing a multimedia transmission.

The MPEG means a movable picture expert group and indicates the standard of defining a compression and release system for a moving picture, the standard being formulated by the MPEG established in 1988. In other words, differently from the JPEG providing a method for compressing a still picture, the MPEG represents a technique for an information transmission through a compression and a code expression of moving picture video data changed continuous according to a time. The MPEG is classified into an MPEG-1 for providing a fidelity of a VCR level and an MPEG-2 for supporting a high-resolution digital video, and the MPEG-1 is being generally utilized.

The server in which the multimedia data is stored transmits the multimedia data to a client as a user terminal by a real time, which is said the streaming, and this multimedia data has a bit stream type.

That is, the steaming is the technique for receiving a sound and moving picture by the real time in an internet, and represents an internet solution for embodying multimedia contents such as audio and video etc. in an internet web, and also allows the multimedia data to be transmitted to a personal computer(PC) through the internet and allows a time required for transmitting massive moving picture data to the internet to be minimized. Such streaming service is influenced by a network bandwidth as the most serious shortcoming, and requires more powerful personal computer so has a restricted service.

For the sake of the multimedia streaming service, it should be performed through a public network in which an ethernet, a local area network (LAN), a wide area network (WAN) and a gigabit network exist in common be between a server and a client. At this time, in this public network bandwidth is frequently changed according to a communication quantity, therefore, is essentially needed a technique of controlling a bit rate of multimedia data to be transmitted by a charge of the bandwidth in order to provide a constant multimedia streaming service.

Under such consideration, in the inventive method for managing multimedia data to support a ceaseless multimedia streaming by adapting to a change of the communication network bandwidth, the already compressed MPEG video data is previously converted into variable bit rate data, then stored, after that, the bit rate of the video data bit stream to be transmitted by the change of the communication network bandwidth is increased/decreased and then is transmitted in executing the real time streaming service between the server and the client.

That is to say, a control of the bit rate in various range is valid according that in the MPEG-1 and MPEG-2 video data, employed can be simultaneously the frame rate controlling method through the frame removal and the fidelity control ling method in which the selection ranges of the discrete cosine transform(hereinafter, referred to as "DCT" coefficients are differently provided by the block unit within the frame. Particularly, in the fidelity controlling method, only a DCT coefficient within a range proper to a desired bit rate is employed from the bit stream based on the already compressed type, instead of employing a re-quantization system by the quantization parameter Q. Therefore, a performance for a process time can be heightened by reducing the process time necessary for a restoring and a re-compression of the video bit stream.

BRIEF DESCRIPTION OF THE DRAWINGS

The above and other objects and features of the instant invention will become apparent from the following description of preferred embodiments taken in conjunction with the accompanying drawings, in which:

FIG. 3 is an embodiment diagram for a fidelity controlling method among media scaling technique in accordance with the present invention;

FIG. 4 is a flow chart showing a method for managing a variable bit rate to provide a streaming service in one embodiment of the invention;

FIG. 5 depicts a detailed flow chart showing a data conversion method performed in an adaptive decomposer, in a method for managing a variable bit rate to provide a streaming service, in one embodiment of the invention.

PREFERRED EMBODIMENT OF THE INVENTION

Hereinafter, preferred embodiments of the present invention will be described in detail with reference to the accompanying drawings.

In accordance with the present invention, the preferred embodiment is described in detail referring to FIGS. 1 to 6, as follows.

Figure 1:
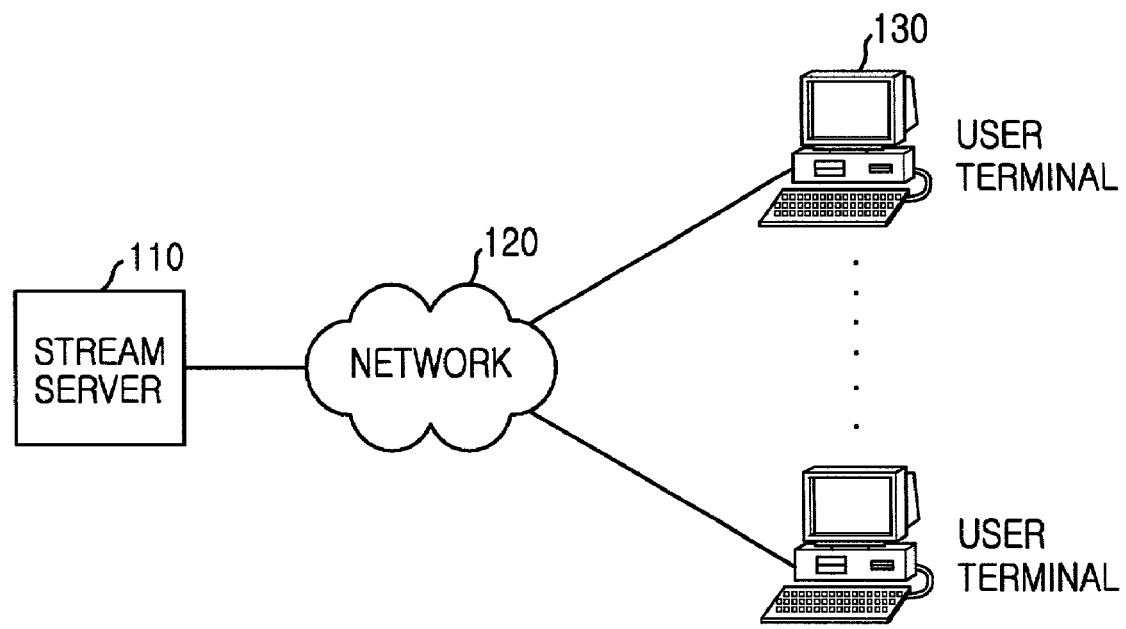
FIG. 1 is a constructive diagram of an information communication system in one embodiment of the present invention.

FIG. 1 is a constructive diagram of an information communication system in one embodiment of the invention, as an overall construction to provide a multimedia streaming service.

As shown in FIG. 1, the inventive information communication system is composed of a stream server 110 for storing multimedia data to provide a multimedia streaming service, a plurality of user terminals 130 which may be said stream clients (hereinafter, referred to as "User Terminal") and receive the multimedia streaming service after a determination of a session with the stream server 110, and a network 120 for owning in common information between the stream server 110 and the plurality of user terminals 130.

Herewith, the network 120 includes not only an Ethernet, a local area network (LAN), a wide area network (WAN) or a gigabit network, but also a public network in which all these networks exist in common.

Also, the user terminal 130 indicates terminals such as a personal computer (PC) etc., and may be connected to the stream server 110 through a line of the same bandwidth, and may be connected to the stream server 110 through a line of mutually different bandwidths. Especially, even in a connection case between the stream server 110 and the session through the line of the same bandwidth, the communication bandwidth required according to a change of a communication quantity in the public network can be frequently changed even during the session connection.

Figure 2:
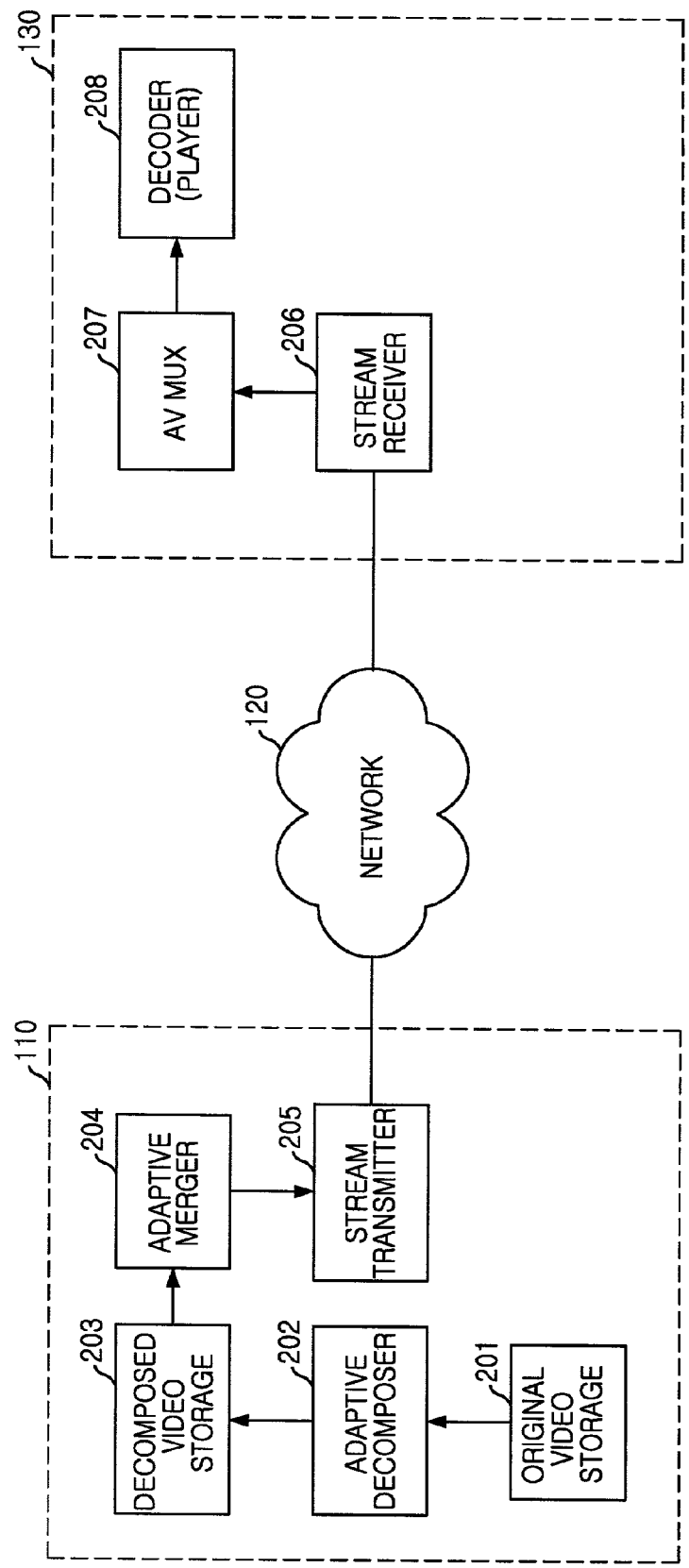
FIG. 2 indicates a detailed block diagram for a stream server and a user terminal in one embodiment of the present invention.

FIG. 2 is a detailed block diagram for the stream server and the user terminal in one embodiment of the invention, and shows in detail an internal construction of the stream server 110 and the user terminal 130 of FIG. 1.

First, as shown in FIG. 2, the stream server 110 includes an original video storage 201, an adaptive decomposer 202, a decomposed video storage 203, adaptive merger 204 and a stream transmitter 205.

The original video storage 201 stores original video data compressed by the MPEG.

An inventive frame rate controlling method through a removal of a frame and a fidelity controlling method can be simultaneously applied to, in order for a variable bit rate management of an MPEG video bit stream, and for it, the adaptive decomposer 202 changes an MPEG video data file stored in the original video storage 201 into a file type for supporting a variable bit rate through a media scaling decomposing process, wherein the fidelity controlling method is gotten by differently providing selection ranges of DCT coefficients in a block unit within a frame. This media scaling decomposing procedure is no needed to be processed by the real time. This file type is the file type proposed in the invention, and represents a scalable media object, e.g., a file based on 000.smo type.

The changed file is stored at the decomposed video storage 203.

When the user terminal 130 is connected to the session, the stream server 110 decides bit rate of transmission video data after checking a traffic state of a communication network and a bit rate state required by a user side, after that, acquires the scalable media object file such as smo file which is previously media-scaled and stored at the decomposed video storage 203, and then recombines it in the adaptive merger 204.

Input data of the adaptive merger 204 is several number of scalable media object files as the smo file, and its output data is an MPEG compatible video bit stream. The MPEG compatible video bit stream re-constructed properly to a required bit rate in the adaptive merger 204 is transmitted to the user terminal 130 through the stream transmitter 205. At this time, the stream transmitter 205 of the stream server 110 transmits an audio bit stream and a video bit stream through a specific channel to the stream client.

Next, the user terminal 130 is made up of a stream receiver 206, an AV MUX (multiplexer/demultiplexer) 207 and a decoder 208 as shown in the drawing.

The stream receiver 206 receives the audio bit stream and the video bit stream transmitted from the stream server 110, and sends it to the AV MUX 207 to perform a multiplexing procedure.

The AV MUX 207 is provided as the MPEG compatible system coder, and receives an MPEG audio it stream and an MPEG video bit stream as input data, to produce an MPEG compatible system bit stream.

Such produced MPEG compatible system bit stream is reproduced in the MPEG decoder 208, and is outputted onto a screen.

These output data of the adaptive decomposer 202 and input data of the adaptive merger 204 are based on the scalable media object file type of smo file generated by applying the inventive variable bit rate deciding method. Further, the inventive media scaling technique utilizes the method provided by simultaneously employing the frame rate controlling method and the fidelity controlling method, wherein the frame rate controlling method is gained by classifying respective frames according to a picture type as I, P, B types and selecting only a picture type proper to a desired bit rate and then removing the rest frames and transmitting it, and the fidelity controlling method is obtained by classifying DCT coefficients corresponding to respective 8×8 blocks into unit groups as A-302, B-303 and C-304 and transmitting only DCT coefficient groups corresponding to a range of a desired bit rate, namely, by differently providing selection ranges of the DCT coefficients in a unit of a block within the frame.

FIG. 3 is a drawing of one embodiment for the fidelity controlling method among the media scalable technique in the invention, and shows an 8×8 DCT coefficient block 301 and a classification for 3 groups as an A group 301, a B group 303 and a C group 304.

A compression minimum unit in the MPEG standard is the 8×8 block composed of 64 pixels and this block becomes the DCT. This DCT means that a video is converted into a frequency component like that voice is represented as frequency. Herewith, each pixel is represented as a luminance signal indicating a brightness and two kinds of color difference signals indicating color, and each signal as a pixel value is processed. Meantime, in the JPEG, a screen is decomposed into numerous matrixes based on a pixel unit of 8×8 and it is performed the DCT for each matrix. An array of pixel values in the matrix before the transformation corresponds to an X-Y coordinate of an original picture, but respective elements after the transformation can be changed and arrayed in an order from a low frequency component to a high frequency component, being directed in jig jag from a left upper part to a right lower part, that is, it is represented through a decomposing into frequency components of 64 patterns. Each element value of the matrix after the DCT transform becomes a coefficient indicating that the original video can be reproduced when the patterns of the respective frequency components are folded by which extent strength.

In other words, after he DCT transform, the 8×8 pixel block is converted into the 8×8 DCT coefficient block 301 according to a characteristic of frequency. At this time, the lowest frequency term is provided as a DC DCT coefficient and has a mean brightness value of the 8×8 block. The rest 63 DCT coefficients are provided as an AC DCT coefficient. Also a scan system of the 8×8 block is a jig-jag scan.

In the invention, the DCT coefficients of the 8×8 block are largely classified into three groups, namely, it is named an A group 302 for a DCT coefficient group of a low frequency hang, a B group 303 for a DCT coefficient group of a medium frequency hang, and a C group 304 for a DCT coefficient group of a high frequency term FIG. 4 is a flow chart in one embodiment of the variable bit rate managing method for the streaming service in the invention.

The original video storage 201 stores the original video data compressed by the MPEG in a step 402.

The adaptive decomposer 202 performs a media scalable decomposing process for the MPEG video data file stored in the original video storage 201, to thus change it to a file type for supporting a variable bit rate in a step 404, in order to execute a variable bit rate management or the MPEG video bit stream to which the frame rate controlling method through a removal of the frame and the fidelity controlling method can be applied simultaneously, the fidelity controlling method being gotten by differently providing the selection ranges for the discrete cosine transform (DCT) coefficients in a unit of the block within the frame.

The changed file is stored at the decomposed video storage 203 in a step 406, and when the user terminal 130 and the session is connected, the stream server 110 decides the bit rate of the transmission video data after checking a traffic state of the communication network and a desired bit rate state of a user side. And then, the stream server 110 acquires the scalable media object files as the smo file which is previously media-scaled and stored at the decomposed video storage 203 and recombines it in the adaptive merger 204 in a step 408, in order to generate the MPEG video data corresponding to the decided bit rate.

Input data of the adaptive merger 204 is several number of scalable media object files as the smo file, and output data thereof becomes an MPEG compatible video bit stream. The MPEG compatible video bit stream reconstructed properly to a desired bit rate in the adaptive merger 204 is transmitted to the user terminal 130 through the stream transmitter 205, in a step 410.

The user terminal 130 having the transmission of the MPEG compatible video bit stream sends the bit stream to the AV MUX 207 to perform a multiplexing procedure for the transmitted audio and video bit stream, and the AV MUX 207 receives the MPEG audio and video bit streams as input data, to generate the MPEG compatible system bit stream. This generated MPEG compatible system bit stream is reproduced in the MPEG decoder 208 and then outputted onto the screen.

FIG. 5 is a detailed flow chart showing one embodiment of a data changing method performed in the adaptive decomposer among the variable bit rate managing methods for the inventive streaming service, and represents in detail a step 404 of converting the original video data into the file type for supporting the variable bit rate, among the procedures of FIG. 4.

At first, it is read a first portion from the bit stream of the MPEG video data file stored at the original video storage 201, in a step 502.

It is checked in a step 504 whether or not this read bit column is a sequence end coding indicating an end of the MPEG video bit stream, and in a case of the sequence end code, it is stored at a t1f1.smo file and a decomposing procedure is finished.

Meanwhile, in case that it is not the sequence end code in the step 504, it is checked and clarified in a step 506 whether the read bit column is header information of the MPEG video or data information.

In a case of the header information in the step 506, this bit column is stored at the f1f1.smo file in a step 508, and it is repeatedly performed from a step 502 of reading a next bit column in the original MPEG video bit stream.

In a case of the data information not the header information in the step 506, a decomposing is progressed in a step 510 according to a picture type as I, P and B types of a frame into which a currently progressing bit column is contained. In other words, the decomposing is subdecomposed according to the DCT coefficient group of the 8×8 block which corresponds in common to all the picture types, in steps of 512, 520 and 528.

In a case of an I picture and in case that the DCT coefficient of the read bit column is the DCT coefficient corresponding to the A group 302 in a step 512, the DCT coefficient is stored at the t1f1.smo file in a step 514 and it is repeatedly performed from the step 502 of reading the next bit column in an input MPEG video data file. At this time, all the header information and the low frequency term DCT coefficient of each block provided within the I-picture are stored in the t1f1.smo file, which is the minimum information for reproducing the given original MPEG video bit stream and has even in its itself a characteristic of compatible with the MPEG video standard in the meantime, in case that the read bit column is the DCT coefficient corresponding to the B group 303 in the step 512, it is stored at a t1f2.smo file in a step 516. In case that the read bit column is the DCT coefficient corresponding to the C group 304 in the step 512, it is stored at a t1f3.smo file at a step 518. Then it is repeatedly performed from the step 502 of reading the next bit column in the input MPEG video data file.

Meanwhile, in a case of a P picture in the step 510 of progressing the decomposing according to the picture type (I, P, B) of the frame containing a currently progressing bit column, and in case that the DCT coefficient of the read bit column is the DCT coefficient corresponding to the A group 302 in a step 520, the DCT coefficient is stored at a t2f1.smo file in a step 522 and it is repeatedly performed from the step 502 of reading the next b it column in the input MPEG video data file. While, in case that the read bit column is the DCT coefficient corresponding to the B group 303 in the step 520, it is stored at a t2f2.smo file in a step 524. In case that the read bit column is the DCT coefficient corresponding to the C group 304 in the step 520, it is stored at a t2f3.smo file at a step 526. Then, it is repeatedly performed from the step 502 of reading the next bit column in the input MPEG video data file.

Further, in a case of a B picture in the step 510 of progressing the decomposing according to the picture type (I, P, B) of the frame, and in case that the DCT coefficient of the read bit column is the DCT coefficient corresponding to the A group 302 in a step 528, the DCT coefficient is stored at a t3f1.smo file in a step 530 and it is repeatedly performed from the step 502 of reading the next bit column in the input MPEG video data file. Meantime, in case that the read bit column is the DCT coefficient corresponding to the B group 303 in the step 5280, it is stored at a t3f2.smo file in a step 532. In case that the read bit column is the DCT coefficient corresponding to the C group 304 in the step 528, it is stored at a t3f3.smo file at a step 534. Then, it is repeatedly performed from the step 502 of reading the next bit column in the input MPEG video data file.

As above-described, the adaptive decomposer 202 stores the MPEG video data file on the basis of the inventive scalable media object file type as the smo file.

Figure 6A:
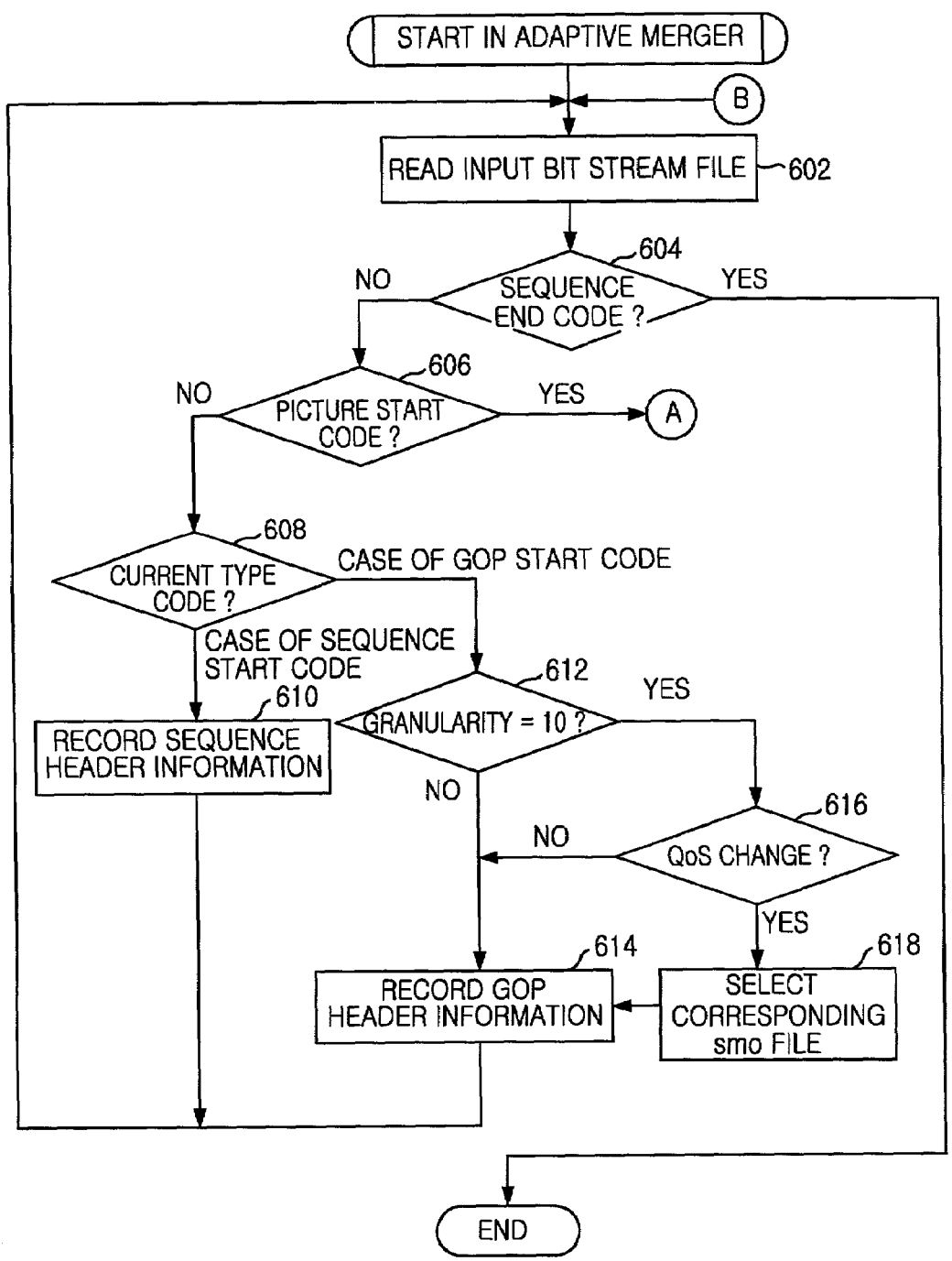
FIGS. 6a and 6b are detailed flow charts for a data merging method in an adaptive merger in a method for managing a variable bit rate for a streaming service, in one embodiment of the invention.
Figure 6B:
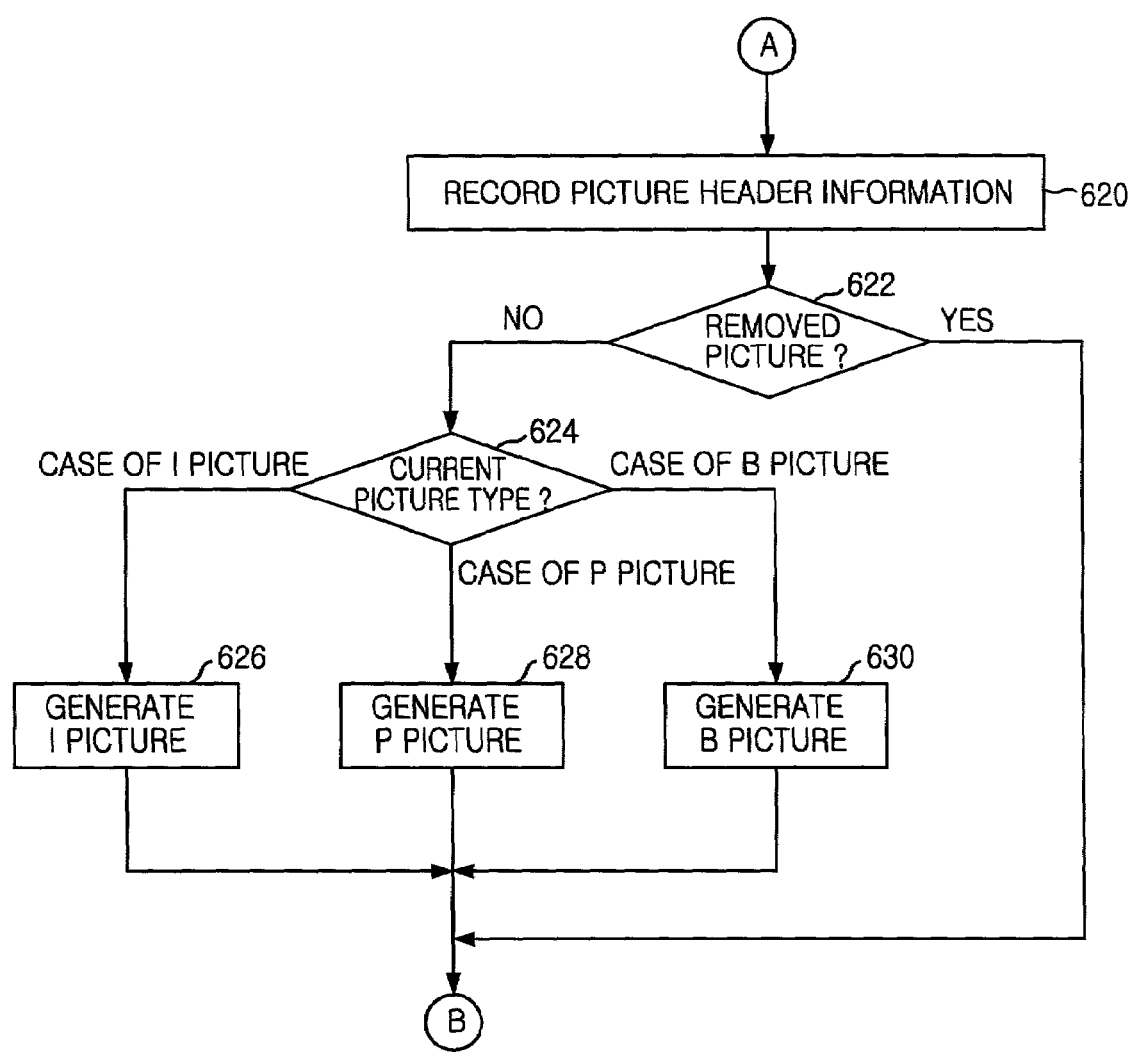

FIGS. 6a and 6b are detailed flow charts for a data merging method in an adaptive merger in a method for managing a variable bit rate for a streaming service in one embodiment of the invention.

At first, it is read the scalable media object file as the smo file stored at the decomposed video storage 203 in a step 602.

It is clarified in a step 604 whether or not this read bit stream file is a sequence end code, and in a case of the sequence end code, it is stored in a bit stream file and a merging procedure is finished.

Meanwhile, in case that it is not the sequence end code, it is checked and clarified in a step 608 whether this read code is a sequence start code or a GOP start code.

In a case of the sequence start code, the sequence header information is recorded in a generation bit stream in a step 610, and it is repeatedly executed from the step 602 of reading the next bit column in an input bit stream file.

While, in a case of the GOP start code, it is first checked whether a granularity of a corresponding GOP is 10, in a step 612, wherein the granularity indicates a quantity of information provided to decide a visibility of a video, etc. and hereinafter, is referred to as "granularity". If the granularity is not 10, GOP header information is recorded at the generation bit stream in a step 614, and it is repeated performed from the step 602 of reading the nest bit column in the input bit stream file. Herewith, what the granularity is 10, represents a case that ten GOPs are entered thereinto, namely, if the granularity is 10, a change for a quality of service (hereinafter, referred to as "QoS") is checked in a step 616.

At this time, if there is no the change for the QoS, the GOP header information is recorded in the generation bit stream in a step 614, it is repeatedly performed from the step 602 of reading the next bit column the input bit stream file. Meantime, if there is the change for the QoS, a corresponding scalable media object file as the smo file is selected so as to be prepared to read as a next input bit stream file in a step 618, and the GOP header information is recorded at the generation bit stream in the step 614. Then, it is repeatedly performed from the step 602 of reading the next bit column in the input bit stream file.

While, in a case of the picture start code in the step 606, picture header information is recorded at the generation bit stream in a step 620.

Then, it is decided in a step 622 whether a current picture is a picture removed in the step 618 of selecting the corresponding scalable media object file as the smo file by the change of the QoS. Herewith, in case the B picture is removed, it is the case that all the t3f1.smo, t3f2.smo and t3f3.smo files are not selected, and in case that the P picture is eliminated, it is the case that all the t2f1.smo, t2f2.smo and t2f3.smo files are not selected. Herewith, the I picture can not be eliminated actually, since the minimum header information of the video bit stream is contained into the t1f1.smo file in the step 508 thus there should exist the t1f1.smo file at the least. This case corresponds to the frame rate controlling method through a removal of the frame.

If it is decided as the removed picture in the step 622, the GOP header information is recorded at the generation bit stream in the step 614, and it is repeatedly performed from the step 602 of reading the next bit column in the input bit stream file.

In case that it is not the removed picture, a picture corresponding to a current picture type is generated in a step 624. At this time, in a case of the I picture, the t1f1.smo or t1f1.smo, t1f2.smo or t1f1.smo, t1f2.smo and t1f3.smo files are combined according to the scalable media object file as the smo file selected by the change of the QoS, to generate the I picture in a step 626. In a case of the P picture, the t2f1.smo or t2f1.smo, t2f2.smo or t2f1.smo, t2f2.smo and t2f3.smo files are combined according to the scalable media object file as the smo file selected by the change of the QoS, to generate the P picture in a step 628. In a case of the B picture, the t3f1.smo or t3f1.smo, t3f2.smo or t3f1.smo, t3f2.smo, and t3f3.smo files are combined according to the scalable media object file the smo file selected by the change of the QoS, to generate the B picture in a step 630. Namely, this case is for the fidelity controlling method in which the selection ranges of the DCT coefficients in a unit of the block within the frame are provided differently.

Like this, the MPEG compatible video bit stream is generated through the steps of selecting the scalable media object file as the smo file properly to the change of QoS and combining it in the adaptive merger 204.

As afore-mentioned, the invention is applied to the real time streaming service of multimedia data in an environment that mutually different networks exist in common like an internet etc., thereby the video bit stream based on a bit rate appropriate to various bandwidths of the existing communication network can be generated, further, there is an effect of providing a technique more prominent than the existing technique, in executing the streaming service for the video bit stream based on a fidelity desired by a user.

In accordance with the present invention, particularly, there is a prominent effect of enabling to perform a real time transmission in the streaming service of the multimedia data between the server and the client by previously performing a media scaling for already compressed video data.

That is to say, in the inventive variable bit rate managing method, the multimedia streaming service based on various bit rates can be provided according to a change of the bandwidth in the communication network by using the previously compressed MPEG video data. In addition, only a frame rate can be degraded and only a fidelity can be degraded according to a streaming service bit rate selected by a user in a user terminal, namely, a variety can be provided herein. Further, it can be prevented an unnecessary waste of the bandwidth in the communication network by transmitting only a video bit stream of a bit rate proper to the bandwidth of the communication network.

It will be apparent to those skilled in the art that various modifications and variations can be made in the present invention without deviating from the spirit or scope of the invention. Thus, it is intended that the present invention cover the modifications and variations of the invention provided they come within the scope of the appended claims and their equivalents.

What is claimed is:

1. A method for providing a variable bit rate for a streaming service in an information communication system, comprising the steps of:
    a) decomposing a stored original video bit stream into a plurality of files of a plurality of file types, and then storing the files, wherein each of the plurality of file types is defined by at least a picture type of a frame and a discrete cosine transform (DCT) coefficient group;
    b) merging selective files of the plurality of files and selective frames based on the decomposed file types by considering a traffic state of a communication network; and
    c) providing the streaming service by using the video bit stream merged.

2. The method as recited in claim 1, wherein the step a) decomposing the original video bit stream is gained by applying a frame rate controlling system through a frame removal and a fidelity controlling system in which selection ranges for a discrete cosine transform (DCT) coefficient are differently provided in a unit of a block within a frame.

3. The method as recited in claim 1, wherein the step a) includes the steps of:
    a1) reading a bit column of a bit stream in a video data file stored at an original video storage;
    a2) storing the bit column in case that the bit column is header information, after that, re-executing from the step a1);
    a3) checking the picture type of the frame into which the bit column is contained in case that the bit column is data information;
    a4) classifying the picture type into each of I picture type, P picture type and B picture according to the checking result of the step a3); and
    a5) determining respective files on the bases of a group into which the DCT coefficient of the bit column is contained according to each picture type, and storing the bit column at the file of the group into which the DCT coefficient of the bit column contained.

4. The method as recited in claim 3, wherein the bit column of the step a2) is stored at the file of the I picture type at which minimum information capable of reproducing the original video bit stream is stored.

5. The method as recited in claim 1, wherein said step b) includes the steps of:
    b1) reading the files stored in the step a);
    b2) storing the file as a bit stream file in case that the file is a sequence end code, and checking whether or not the file is a picture start code in case that the file is not the sequence end code;
    b3) checking whether or not the file is a sequence start code, in case that the file is not the picture start code in the checking result of said step b2);
    b4) recording sequence header information at a generation bit stream in case that the file is the sequence start code in the checking result of said step b3), and re-executing from said step b1);
    b5) deciding a quality of service in the communication network to which the bit stream is transmitted, in case that the file is not the sequence start code in the checking result of said step b3), and selecting a transmittable frame type and the DCT coefficient group; and
    b6) generating the bit stream for the bit column contained into the picture type and the DCT coefficient group which are selected in said step b5), in case that the file is the picture start code in the checking result of said step b3).

6. The method as recited in claim 5, wherein said step b6) includes:
    b6-1) checking whether there is a change in the quality of service of the communication network to which the bit stream is transmitted, in case that a granularity is 10;
    b6-2) selecting the picture type and the DCT coefficient group corresponding to such a case that there is the change in the quality of service, after that, recording the header information, and re-executing from said step b1); and
    b6-3) recording the header information in case that there is no the change in the quality of service or the granularity is not 10, and re-executing from said step b1).

7. A computer readable record medium storing instructions for executing a method for providing a variable bit rate for a streaming service in an information communication system, the method comprising the steps of:

a) decomposing a stored original video bit stream into a plurality of files of a plurality of file types, and then storing the files, wherein each of the plurality of file types is defined by at least a picture type of a frame and a discrete cosine transform (DCT) coefficient group;

b) merging selective files of the plurality of files and selective frames based on the decomposed file types by considering a traffic state of a communication network; and c) providing the streaming service by using the video bit stream merged.

* * * * *